Aug. 5, 1947.   J. LEDWINKA   2,425,282
RAILWAY TRUCK FRAME
Filed Sept. 17, 1943   3 Sheets-Sheet 1
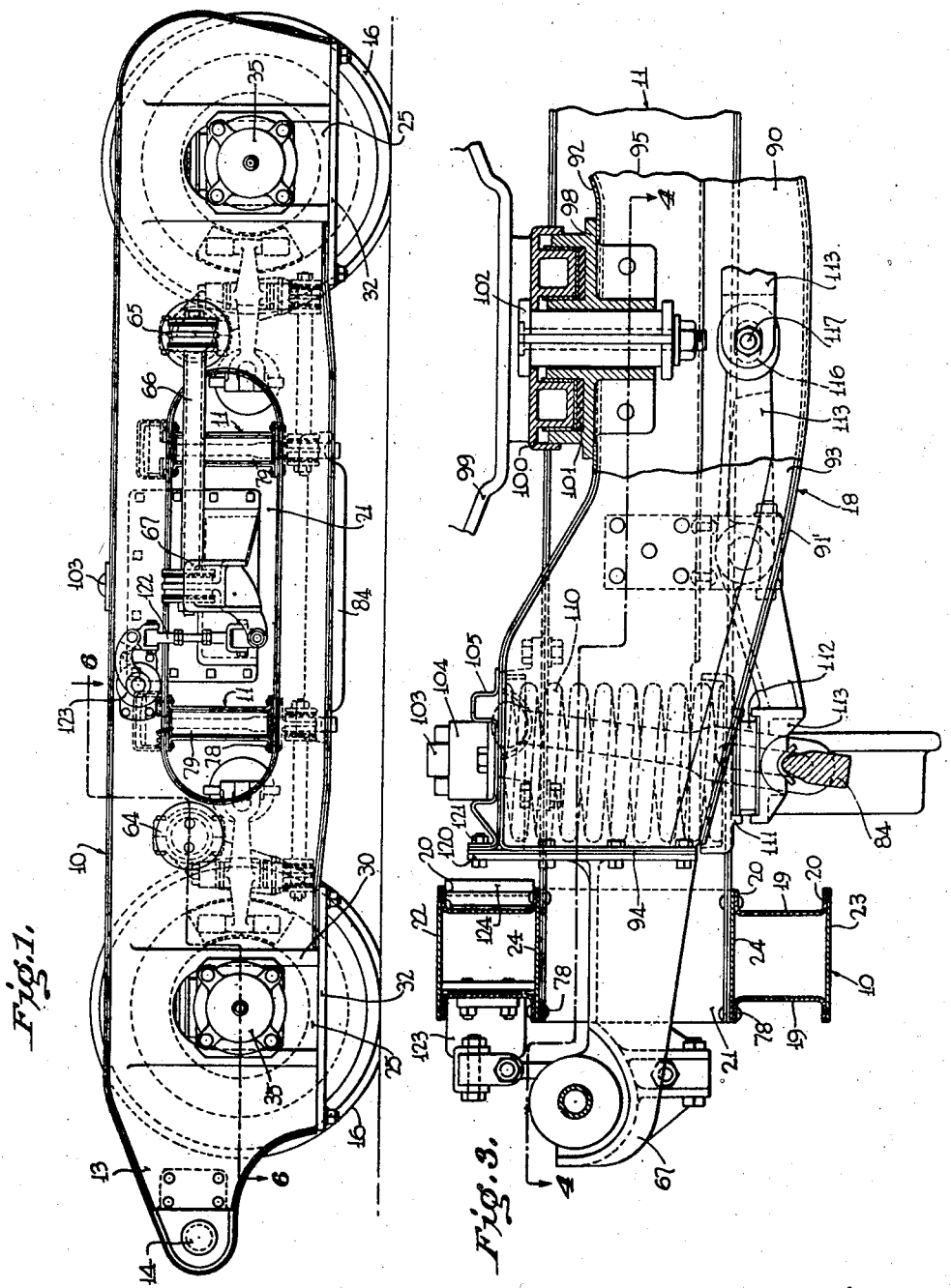
Joseph Ledwinka
INVENTOR
BY John P. Tarbox
ATTORNEY

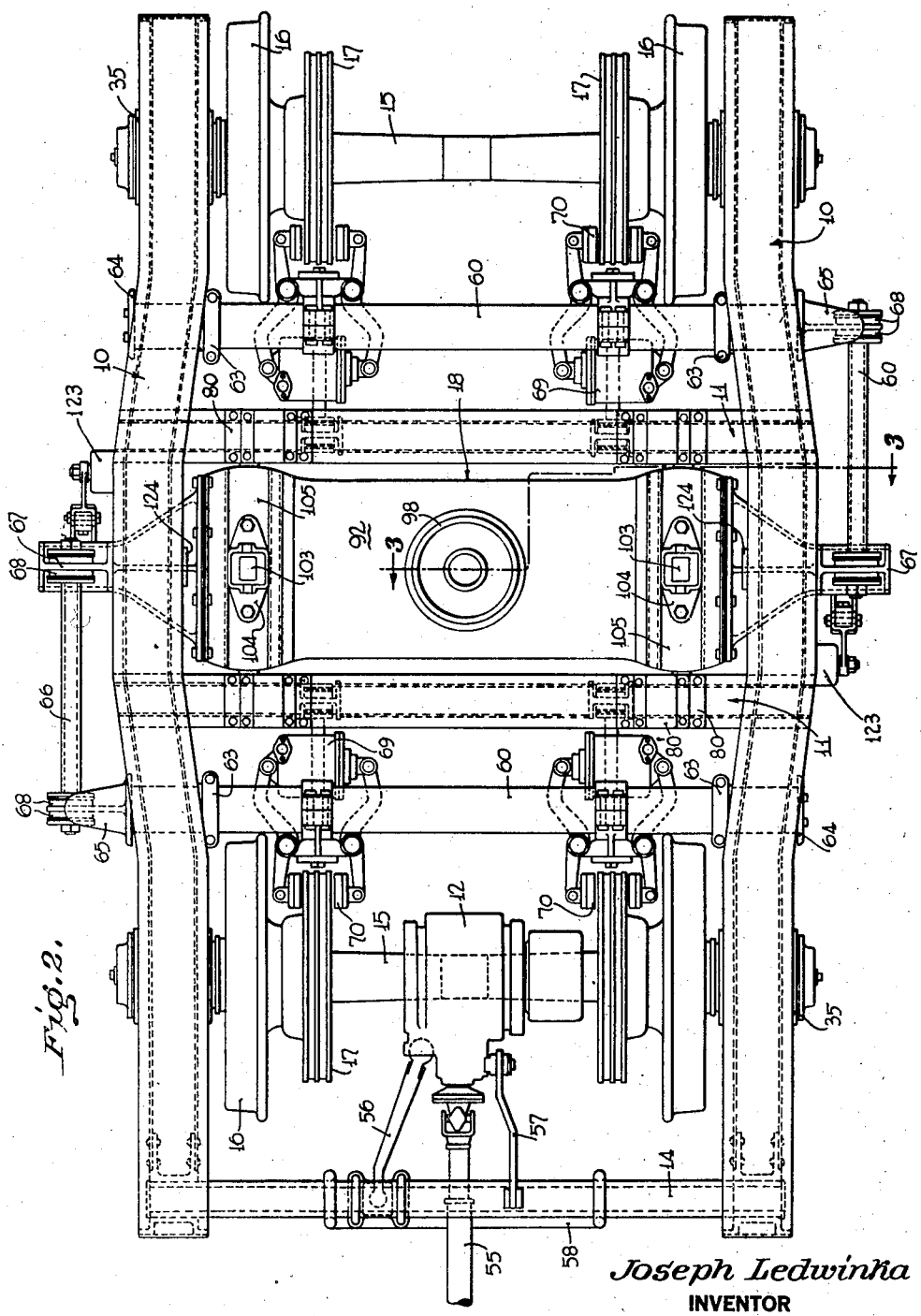

Aug. 5, 1947.  J. LEDWINKA  2,425,282
RAILWAY TRUCK FRAME
Filed Sept. 17, 1943  3 Sheets-Sheet 3
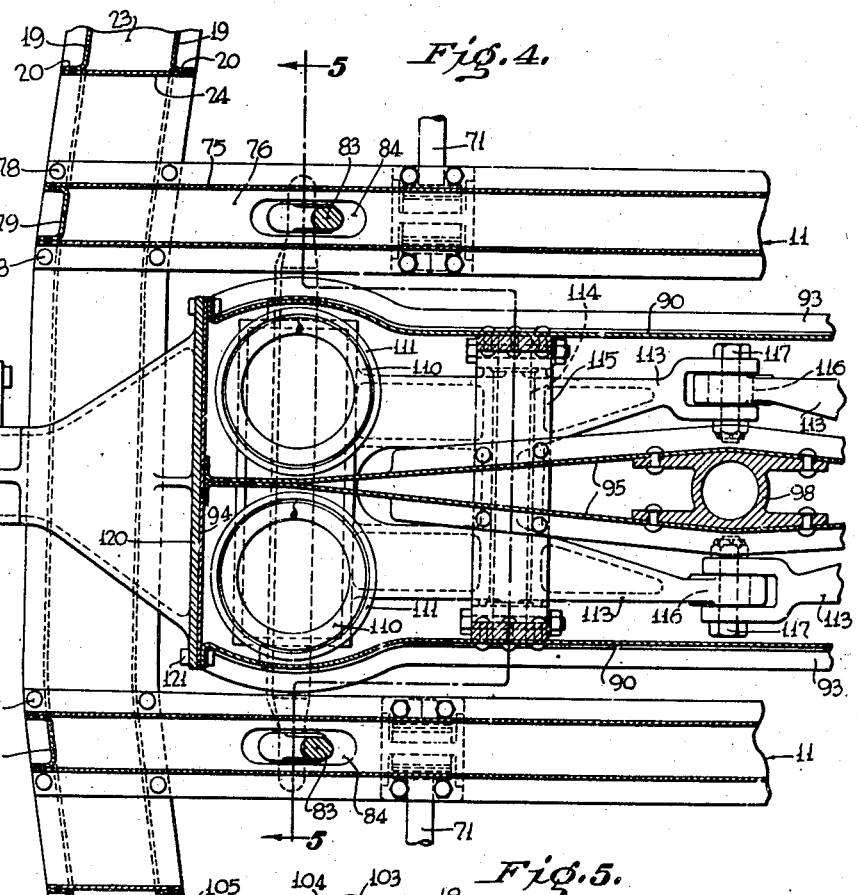
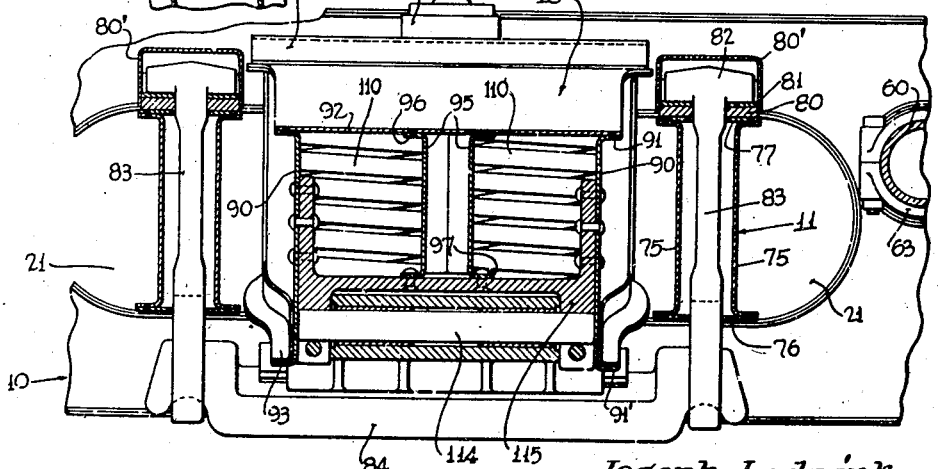
Joseph Ledwinka
INVENTOR
BY John P. Tarbot
ATTORNEY Patented Aug. 5, 1947

2,425,282

UNITED STATES PATENT OFFICE 2,425,282

RAILWAY TRUCK FRAME

Joseph Ledwinka, Philadelphia, Pa., assignor to The Budd Company, Philadelphia, Pa., a corporation of Pennsylvania Application September 17, 1943, Serial No. 502,721

2 Claims. (Cl. 105—182)

The invention relates to rail car trucks, and more particularly to the type of trucks which are mainly composed of high-strength sheet metal parts joined together by electric resistance welding.

The invention relates, however, also to certain details which may be applicable to other types of trucks, such as to the spring suspension, the attachment of the bolster, and to guiding means for the latter.

Among the objects of the invention is to provide a truck of the indicated type which is light in weight yet strong.

Another object of the invention is to provide a truck of the indicated type which lends itself, on account of the cross sections and shapes given to its component members, to the manufacture of those members of high-strength cold rolled stainless sheet steel and to the easy and convenient assembly by electric spot welding.

The features of the invention as well as further objects and advantages thereof will become apparent from the embodiment illustrated in the attached drawing and described in the following.

In the drawing:

Figure 1 is a side view of a truck built in accordance with the invention;

Figure 2 is a plan view of the same truck;

Figure 3 is a fragmentary section on a larger scale along line 3—3 of Figure 2;

Figure 4 is a horizontal fragmentary section through the central portion of the truck along line 4—4 of Figure 3;

Figure 5 is a fragmentary section along line 5—5 of Figure 4.

The truck frame consists mainly of two side frames 10 interconnected by a pair of transoms 11. In the case of a generator drive 12 on one of the trucks of a rail car, the side frames 10 of such truck have one of their ends extended at 13 and interconnected by a tube 14. 15 are the axles which carry the wheels 16 with brake discs 17. 18 is the bolster which is arranged between the transoms 11.

Each side frame comprises two vertical plates 19 which are spaced from each other and provided with outwardly directed flanges 20 along their margins and around an elongated opening 21 in their central portions. Strips 22, 23 and 24, substantially flat in cross section, are connected, such as by electric welding, to the flanges 20 and interconnect the two plates 19 of each frame 10. The members 19, 22, 23 and 24 form together a system of intercommunicating closed box sectional girders extending nearly throughout the entire length of the frame 10.

At the location of the axles 15, the plates 19 are provided with slots 25 which extend from the underside of the frame upwardly to a point spaced from the upper side of the frame. The plates are interconnected all around said slots—not shown—transverse members.

The ends of the axles 15 may be rotatably supported by anti-friction bearings in axle boxes 35.

The resilient support of the axle boxes in the frames, the aforesaid transverse members between the plates around the slots for the axle boxes, as well as the details of the anchor plates 32 which bridge the open ends of the slots 25 are fully disclosed and form the subject matter of applicant's patent entitled "Axle suspension," No. 2,410,402, issued November 5, 1946, the subject matter of which was divided out of the present application.

It will be noted at this point that in this truck equalizer bars are omitted and that the side frames take their place.

On trucks with equalizer bars, these bars rest on top of the journal boxes and, therefore, have no spring suspension and receive all the shocks of the rails, thus increasing the unsprung weight considerably.

The generator drive 12 with its connecting shaft 55 may be of customary design. It is prevented from rotating by torque links or arms 56, 57, one of which is a safety arm. A safety rail 58 attached to the cross member 14 serves for holding the shaft 55 if the connection between it and the adjoining portions are accidentally broken.

At each end of the truck between the wheels 16 and the transom 11 is a tubular transverse member 60 which extends through openings in the walls 19. Lateral movement of the tube 60 is limited by collars 63, a removable plate 64 at one end and a bracket 65 at the other end. The last-named bracket 65 serves for holding a guide rod 66 which is attached to the bracket and to an outward extension 67 of the bolster 18 by means of rubber cushions 68. The tubes 60 carry brake units 69 with cylinder, actuating arms and brake shoes 70 for each wheel. The torsional forces exerted on the brake unit are taken up and the brake is held in place by a torque rod 71 which by means of rubber cushions 72 between a downward extension of the brake unit and a bracket 73 attached to the transom 11. This brake supporting structure is disclosed and claimed in a co-pending divisional application Serial No. 694,796 filed September 4, 1946.

Each transom 11 consists of two plates 75 which are spaced from each other in the longitudinal direction of the truck and have their marginal flanges connected to top and bottom plates 76. The ends of the transoms 11 fit into the opening 21 and are attached to the side frames by means of rivets 78 which extend through the overlapping portions of the plates 19 and 24 and of the plates 75, 76. The open ends of the transoms 11 are closed by welded-in channel section members 79.

Each transom 11 carries near each of its ends a bearing 80 provided with a lining 81. Supported by the upper surface of the lining 81 is the T-shaped head 82 of a swing hanger 83, the shank of which extends through openings in the lining 81 and the bearing 80, through elongated openings 84 of the walls 76 and through the space between the side walls 75 of the transom 11. The heads 82 have, as clearly recognizable from the drawing, especially from Figure 3, a rolling motion with respect to their bearings 80, 81 instead of the hitherto customary rotating motion. This prevents wearing at this seat as the whole load is supported by these hangers. The heads 82 with their bearings 80, 81 are enclosed by casings 80'.

Each pair of links 83 carries in openings of their lower ends a bridging member 84, the function of which will be described later on.

The construction of the bolster 18 follows similar lines as the construction of the side frames 10 and the transoms 11. The bolster has vertical walls 90 provided with marginal flanges 91, 91'. The upper marginal flanges 91 are connected, as by spot welding, to a top plate 92. The underside of the bolster 18 is substantially open but the lower margins of the plates 90 are reinforced by angle section members 93 nested in the angle formed by the plates 90 and their lower flanges 91' and are welded to these parts. The plates 90 and 92 are outwardly flanged at their ends and connected, as by spot welding, to an end plate 94 on each side of the truck. Reinforcing plates 95 have their ends flanged and secured to the end plates 94. The plates 95 are connected to each other for some distance close to their ends but they diverge toward the center of the truck. The upper and lower margins of the plates 95 are flanged at 96 and 97; the upper flanges are attached, as by spot welding, to the top plate 92.

The central portion of the bolster 18 is downwardly offset with respect to its end portions. A center bearing 98 extends through an opening in the top plate 92, is supported by said top plate and secured, as by rivets, to the reinforcing walls 95 as clearly shown in Figures 3 and 4. The body bolster 99 enters with its supporting member 100 the annular groove in the top of bearing 98 and rests therein on a rubber cushion 101. A center pin 102 holds the members 98, 100 together.

Rollers 103 are supported by brackets 104 near the ends of the bolster 18 on the upper wall 92 thereof and serve as side bearings for the body. Reinforcing rails 105 are inserted between the wall 92 and the bearing 104 and extend over the entire width of the bolster 18.

One pair of springs 110 is arranged in each end of the bolster 18 between the side walls 90 and on both sides of the inner reinforcing walls 95. The side walls 90 are outwardly curved near their ends so as to make room for these springs. The upper ends of the springs rest against the top wall 92 of the bolster whereas their lower ends rest on cup-shaped members 111. The underside of the members 111 are supported by means of rubber cushions 112 on the outer end of a bifurcated arm 113 which in turn is engaged by the hereinbefore described bridge member 84. Arm 113 is journalled about half way between the spring 110 and the center bearing 98 on shaft 114 rotatable about a horizontal axis extending in the longitudinal direction of the truck. The shaft 114 is supported by a bracket 115 which is attached, as by rivets, to the side walls 90 and the inner reinforcing walls 95 of the bolster as clearly shown in Figures 3, 4 and 5.

The inner ends of the arms 113 on opposite sides of the longitudinal center line of the truck are connected to each other at the center line by rubber bushed oval eyes 116 and pins 117. The rubber insert gives just enough movement to take care of the difference in length caused by the pivoting of the two levelizers 113. These levelizers prevent the body and the bolster from undue outward inclination while driving through curves and force them to move substantially translationally up and down.

Attached to the end plates 94 of the bolster 18 are the hereinbefore mentioned end pieces 87, which are formed as castings or forgings. These end pieces have their plate-like inner portion 120 attached by screw bolts 121 to the end flanges of the walls 90 and the margins of the end plates 94. The outer ends of the members 87 extend through the openings 21 in the side frames and have attached thereto, in addition to the guide bars 66, the links 122 of shock absorbers 123, which latter are attached to the outside of the respective frames 10.

The lateral movement of the bolster unit is controlled by the swing hangers 83 and related parts and is limited by rubber bumpers 124. The bolster is guided or kept with respect to the longitudinal extent of the frame by the hereinbefore described anchor rods 66 and the rubber washers 68, the washers 68 giving such flexibility as to allow the bolster to sway laterally and vertically with respect to the frame. It will be noted that there is but one anchor rod 66 on each side of bolster and frame, and that the two rods are placed diagonally opposite, which is believed to be the proper arrangement. By the described suspension and guiding means, the bolster is restrained from any movements except those proper for its function.

The invention is especially designated for high strength construction, preferably of cold rolled stainless sheet steel, the parts of which are welded together by electric spot welding. It will be understood that the invention is not restricted to the specific embodiment illustrated in the drawing and described hereinbefore but that many modifications will occur to those skilled in the art. All such modifications are intended to be covered by the attached claims.

What is claimed is:

1. A truck frame for railway vehicles comprising two side frames interconnected by transoms, each side frame having two generally vertically-arranged spaced metal plates provided with elongated registering openings extending fore and aft of the vertical transverse center plane of the truck frame, said plates being provided around said central openings with outwardly directed flanges, a sheet metal band interconnecting the plates of each side frame substantially throughout the margins of said openings, said transoms comprising vertical plates having outwardly directed top and bottom flanges and top and bottom plates attached to the respective top and bottom flanges, the ends of said transoms extending through and being secured in said openings, and securing means between the frames and transoms passing through said flanges on the transoms and frames, said band and the respective top and bottom plates where these parts overlap.

2. A truck frame for railway vehicles comprising two side frames interconnected by transoms, each side frame having two generally vertically-arranged spaced metal plates provided with elongated registering openings extending fore and aft of the vertical transverse center plane of the truck frame, said plates being provided around said central openings with outwardly directed flanges, a sheet metal band interconnecting the plates of each side frame substantially throughout the margins of said openings, said transoms comprising box section structures having lateral flanges at top and bottom extending lengthwise thereof, the ends of said transoms extending through and being secured in said openings, and securing means between said frames and transoms passing through said flanges on the frames and transoms, and the band where these parts overlap.

JOSEPH LEDWINKA.

REFERENCES CITED

The following references are of record in the file of this patent:

UNITED STATES PATENTS

| Number | Name | Date |
|---|---|---|
| 2,237,757 | Eksergian et al. | Apr. 8, 1941 |
| 985,913 | Lindstrom | Mar. 7, 1911 |
| 540,174 | Maher et al. | May 28, 1895 |
| 565,404 | Case | Aug. 4, 1896 |
| 1,781,253 | Spencer | Nov. 11, 1930 |
| 1,869,229 | Thomas et al. | July 26, 1932 |
| 800,921 | Kiesel | Oct. 3, 1905 |
| 2,040,773 | Lewis | May 12, 1936 |
| 2,150,870 | Blomberg et al. | Mar. 14, 1939 |
| 2,207,848 | Barrows | July 16, 1940 |